Patented Apr. 18, 1939

2,154,470

UNITED STATES PATENT OFFICE 2,154,470

DIAZO DERIVATIVES OF GUANYL-UREA-N-SULPHONIC ACIDS AND N-NITRO GUANYL-UREAS

Robert Prescott Parker, Somerville, N. J., assignor to The Calco Chemical Company, Inc., Somerset, N. J., a corporation of Delaware No Drawing. Application July 12, 1937,
Serial No. 153,277

13 Claims. (Cl. 260—140)

This invention relates to stabilized diazo compounds in which the diazo component is chemically united with a guanyl-urea-N-sulphonic acid or a N-nitro-guanyl-urea, the guanyl-urea radical being free from substituents capable of azoic coupling, and the diazo component being free from solubilizing groups. These diazo components will be referred to in the specification and claims as ice color diazo components because of their common use in this type of colors. Throughout the specification and claims, diazo compounds and components when referred to broadly, will include compounds containing more than one diazo group such as tetrazo compounds.

The present invention is based on the discovery that when ice color diazo components are condensed with a guanyl-urea N-sulphonic acid or an N-nitro guanyl-urea in which the guanyl-urea radicals have at least one reactive hydrogen attached to a nitrogen atom and capable of reacting with the diazo component, products are produced which will not couple with ice color coupling components but which can be split by acid into their original components.

These products are very useful in the printing of ice colors as they permit admixture with the coupling component in a suitable printing paste without producing color. The print is then developed by treatment with acids or acid vapors in the usual manner.

The present invention is not limited to the use of any particular guanyl-urea N-sulphonic acid or any particular N-nitro-guanyl-urea. On the contrary, it is generally applicable to such compounds so long as they contain a reactive hydrogen atom attached to a nitrogen atom and are capable of reacting with ice color diazo components. Guanyl-urea N-sulphonic acid itself may be used and because of its cheapness is one of the most attractive compounds usable in the present invention. This product has been prepared and described by Soell and Stutzer, Ber. (1909) 42, 4533 and a more economical process has been described in the copending application of Hans Z. Lecher and A. E. Pierce, Serial No. 153,278 filed July 12, 1937. This sulphonic acid contains one sulphonic group attached to a nitrogen atom and has, most probably, the following formula:

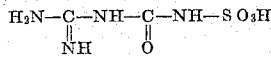

although the exact position of the sulphonic group has not been determined with complete accuracy.

N-nitro-guanyl-urea is another compound which is effectively used in the present invention and may be obtained by the reaction of a mixture of nitric and sulphuric acids on dicyandiamide as described by J. Thiele and E. Uhlfelder, Ann. (1898) 303, p. 107. It has the formula

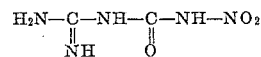

Because of their relative cheapness and the excellent characteristics of the diazo compounds obtained by their use, guanyl-urea N-sulphonic acid and N-nitro-guanyl-urea may be considered as the preferred substances for producing the stabilized diazo compounds of the present invention. However, the invention is not limited to their use and on the contrary their alkyl and aryl derivatives may also be used provided the substitution is not so extensive that all the reactive hydrogen atoms attached to nitrogen atoms have been replaced and also that, in the case of the aryl derivatives, the aryl groups are not of a nature that they couple with the diazo components.

It is an advantage of the present invention that the new stable diazo compounds can be produced with practically any ice color diazo component. Typical amines which can be diazotized or tetrazotized and reacted with guanyl-urea N-sulphonic acids or with N-nitro-guanyl-ureas are the following:

Aniline and its homologues, as e. g. the toluidines, 2,4-dimethylaniline; halogen derivatives of aniline and of its homologues, as e. g. the monofluoroanilines, the monochloroanilines, 2,5-difluoroaniline, 2-fluoro-5-chloroaniline, 2,5-dichloroaniline, m-aminobenzotrifluoride, p-aminobenzotrifluoride, 3-amino-4-chlorobenzotrifluoride, 2-methyl-3-chloroaniline, 2-methyl-4-chloroaniline, 2-methyl-5-chloroaniline, 3-methyl-4-chloroaniline, 5-methyl-2-chloroaniline, 2-methyl-4-chloro-5-bromoaniline, 2-methyl-4,5-dichloroaniline, 4-methyl-2,5-dichloroaniline; nitro-derivatives of aniline and of its homologues and their halogen derivatives, as e. g. the nitroanilines, 2-methyl-4-nitro-aniline, 2-methyl-5-nitro-aniline, 4-methyl-2-nitro-aniline, 2-nitro-4-fluoroaniline, 2-nitro-4-chloroaniline, 3-nitro-4-chloroaniline, 4-nitro-2-chloroaniline; ether derivatives of primary aromatic amines and their halogen derivatives, as e. g. o-anisidine, 2-methoxy-5-methyl aniline, 2,5-dimethoxy-aniline, 2-methoxy-1-naphthylamine, 2-amino-diphenylether, 2-amino-4-acetyl-diphenylether, benzyl-2-aminophenyl-ether, 3-fluoro-4-methoxy-aniline, 2-methoxy-5-chloroaniline, 2,5-dimethoxy-4-chloroaniline, 2-methoxy-4-chloro- 5-methyl-aniline, 2-methoxy-5-bromoaniline, 3-bromo-6-ethoxy-aniline, 4-chloro-2-amino-diphenylether, 4-amino-2-chloro-diphenylether, 4-amino-4'-chloro-diphenylether, 4,4'-dichloro-2-amino-diphenylether, 2,2',5'-trichloro-4-amino-diphenylether; ether derivatives of aniline and its homologues containing nitro groups, as e. g. 2-methoxy-4-nitro-aniline, 2 methoxy-5-nitro-aniline, 2-nitro-4-methoxy-aniline, 2-methoxy-4-nitro-5-methyl-aniline; monoacyl derivatives of aromatic diamines, as e. g. N-hexahydrobenzoyl-p-phenylene diamine, N-hexahydrobenzoyl-p-toluylene diamine, N-benzoyl-p-phenylene diamine; monoacyl derivatives of diamino-phenolethers, as, e. g. 2-benzoylamino-4-amino-anisole, 2-hexahydrobenzoylamino-5-amino-anisole, 2-amino-5-benzoylamino-hydroquinone dimethylether and diethylether, 2-amino-5-hexahydrobenzoylamino-hydroquinone dimethylether and diethylether, 2-amino-5-butyryl-amino-hydroquinone dimethylether and diethylether, 2-amino-5-phenoxyacetylamino-hydroquinone diethylether, the monomethyl and the monobenzyl and the monophenyl-urethane of 2,5-diamino-hydroquinone dimethylether and diethylether, 1-amino-3-benzoylamino- 4,6-dimethoxybenzene; analogous monoacyl derivatives of 2,5-diamino-4-alkoxy-toluenes and of 2,5-diamino-4-alkoxy-chlorobenzenes and of 2,5-diamino-4-alkoxy-benzene sulphodialkylamides; analogous monoacyl derivatives of 1,3-diamino-4,6-dimethylbenzene; the diethylamide of 3-amino-4(4'-chlorophenoxy)-benzoic acid; mono-acyl derivatives of diamino-p-chlorophenyl ethers, as e. g. 2-amino-4-chloro-5-acetylamino-diphenylether, 2-benzoylamino-4-chloro-5-amino-anisole; amino derivatives of aromatic sulphones, as e. g. 3-amino-4-methyl-diphenyl sulphone, 2-amino-4'-methyl-diphenyl sulphone, 2-amino-4-acetyl-diphenyl-sulphone, the ethyl ester of 3-amino-4-(p-toluene-sulphonyl)-benzoic acid, 4-methoxy-3-amino-phenyl-ethyl sulphone, (4-methoxy-3-amino-phenyl)-benzyl sulphone, 4-ethoxy-3-amino-diphenyl sulphone, 2-amino-4-(trifluoromethyl)-phenyl-ethyl sulphone; amino derivatives of aromatic dialkylsulphonamides, as e. g. 3-amino-4-methyl-benzene dimethyl sulphonamide and diethyl sulphonamide, 3-amino-4-methoxy-benzene diethylsulphonamide; xenylamine; alpha and beta naphthylamine; alpha amino-anthraquinone; 2-amino-3-nitro-fluorene and 2-amino-3-nitro-fluorenone; aminodiarylamines and their ether derivatives and their nitro derivatives, as e. g. 2-methoxy-5-amino-diphenylamine, 4-methoxy-4'-amino-diphenylamine, 4-ethoxy-4'-amino-diphenylamine, 3,4'-dinitro-4-amino-diphenylamine; amino-azo-compounds, as e. g. 3,2'-dimethyl-4-amino-azobenzene, 2-methyl-4- amino-5-methoxy-4'-chloro-azobenzene, 4-amino-4'-nitro-3-methoxy-6-methyl-azobenzene, 4-amino-4'-nitro-2,5-dimethoxy-azobenzene, 4-amino-4'-chloro-3-methoxy-6-methyl-azobenzene, the azo dye: diazotized o-anisidine coupled onto alpha-naphthylamine.

There are numerous aromatic diamines in which only one of the amino groups is diazotized and such amino diazo compounds may also be condensed with guanyl-ureas to form products of the present invention. An example of this type of amine is 2,6-dichloro-1,4-phenylene diamine.

Diamines in which both amino groups are diazotized to form tetrazo compounds will also condense with guanyl-ureas. Typical amines of this class are paraphenylene diamine, benzidine, orthotolidine, orthodianisidine, 4,4'-diaminostilbene, 4,4'-diaminodiphenylamine, 2,2-dimethyl-4,4'-diaminodiphenylamine, 1,5-diaminonaphthalene.

Diazo and tetrazo compounds of heterocyclic amines can also be condensed with guanyl-ureas in accordance with the present invention. Typical heterocyclic amines are 2-aminocarbazole, 3,6-diaminocarbazole, 2-nitro-3-aminocarbazole, 2-nitro-3-aminodibenzofuran, 2-amino-3-nitrodibenzothiophene, 1-amino-5-fluorobenzothiazole.

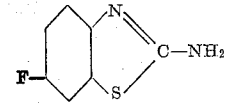

The condensation of ice color diazo components with N-nitro guanyl-urea or guanyl-urea N-sulphonic acids is carried out in alkaline medium at a pH of 8.5 or higher. The optimum pH, however, will vary to some extent with particular diazo components and particular guanyl-urea derivatives. In general, there will be an optimum pH or pH range for each pair of reaction components.

The alkalinity may be obtained in various ways and in some cases it is desirable to use hydrated lime in excess. In such cases the sparingly soluble calcium salt of the stable diazo compounds is first formed and can then be converted into the corresponding soluble alkali metal salt by double decomposition with an alkali metal carbonate or oxalate.

In many cases an excess of the N-nitro guanyl-urea or of the guanyl-urea N-sulphonic acid is of advantage, and it is possible to use such an excess without reagent waste as this excess can be recovered if desired.

The concentration and the temperature at which the reaction is advantageously carried out will, of course, vary with the reaction components used. However, in general, it is advisable to maintain a low temperature and a low concentration.

The derivatives of guanyl-urea N-sulphonic acids contain the solubilizing sulphonic group and in the case of the corresponding N-nitroguanyl-urea compounds the nitro group is capable of transformation into a tautomeric acidic form. Both types of compounds are therefore alkali soluble. It has been found that in the case of the sulphonic acids two series of alkali metal salts, such as sodium salts, exist, namely, mono and disodium salts, the latter having the second sodium atom probably attached to the oxygen of the urea group, although the exact constitution of these di-salts has not as yet been determined. The isolation of the compounds may be effected by salting out or by internal salt formation through the addition of weak acids. The pH of the reaction medium determines whether the product separates as the disodium salt, monosodium salt or internal salt. The method of salting out in alkaline medium is generally preferable as the compounds are not very stable to acids and even the use of weak acids may cause some decomposition.

Because of the complex nature of the condensation products, the exact formula of diazo and tetrazo derivatives has not as yet been established and it has not been possible up to now to determine exactly the position of the diazo group in the molecule.

The compounds are for the most part yellow in color. They are very stable even at elevated temperatures and not explosive which is important as many diazo compounds present considerable explosive hazard. The solubility of the compounds of the present invention in alkali and the stability against hydrolysis in alkaline solution is another important property and constitutes one advantage of the present invention.

The products of the present invention are split by acids in aqueous solution regenerating the component parts of the molecule. The ease with which the compounds are split with acid will of course differ with the different compounds but in most cases heating with acetic acid is sufficient to effect splitting. From the practical point of view, it is important that in this manner an ice color component can be converted into a very stable form from which, however, it may be easily regenerated by the aid of acids.

Because of their desirable properties, the stable diazo and tetrazo compounds of the present invention can be used with ice color coupling components in alkaline printing pastes and prints can be developed with steam containing vapors of weak acids such as formic or acetic acid. The present invention is, however, not concerned with the processes of using the stabilized diazo compounds, this forming a part of the subject matter of the copending application of Lecher and Parker, Serial No. 153,276 filed July 12, 1937. The present invention relates to the stabilized diazo compounds as new chemical compounds and to the process of producing them.

*Example 1*

39 parts of 2-methyl-5-chloro-aniline hydrochloride (90.6%) are stirred with 325 parts of water and 29.4 parts of hydrochloride acid (23° Bé.) until well dispersed. Ice is added to lower the temperature to 3-5° C. The arylamine is diazotized by addition of 14.5 parts of solid sodium nitrite while the mixture is stirred and the temperature is kept below 7° C. by addition of ice.

55 parts of guanyl-urea N-sulphonic acid are slurried in 900 parts of water and dissolved by addition of 36 parts of sodium hydroxide. Ice is added to lower the temperature to 0-5° C. The diazo solution prepared as above is slowly added. The temperature is maintained below 10° C. during the reaction, conclusion of which is indicated by a negative diazo test on spotting with alkaline R-salt.

The solution is heated to 35° C. and filtered. To the filtrate is added ice to lower the temperature to 5° C., and then 0.27 part of sodium chloride for each part by volume of the solution is added. The precipitated product is filtered, pressed in a hydraulic press, and dried at 40-65° C. The product shows, after grinding, a light yellow color and is readily soluble in water.

The initial pH of the alkaline solution of guanyl-urea N-sulphonic acid is about 12.7. After the condensation with the diazo compound the pH has dropped to about 11.7. The reaction may be carried out also at a lower pH, but then the yield is less favorable.

The product obtained has probably the formula:

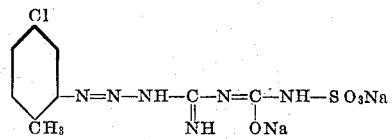

*Example 2*

3.3 parts of 2,5-dichlor-aniline are dissolved in a mixture of 13.7 parts of hydrochloric acid (23° Bé.) and 40 parts of water at 90-95° C. Ice is added to the clear solution to lower the temperature to 5-7° C. The arylamine is diazotized by addition of 1.4 parts of solid sodium nitrite while the temperature is kept below 10° C. by addition of ice. To the diazo solution are added 18.5 parts of acetic acid (20%) and 3.7 parts of hydrated lime, and the solution is then filtered.

To 150 parts of water, heated to 80° C., are added 11 parts of guanyl-urea-N-sulphonic acid and 5.6 parts of hydrated lime. The mixture is stirred to a thick slurry and the temperature is then lowered to 5° C. by addition of ice. The diazo solution prepared as above is rapidly added. The temperature is maintained below 7° C. during the reaction by addition of ice. This particular reaction requires about 8-12 hours.

To the reaction mixture is added a solution containing 16 parts of soda ash in 50 parts of warm water. While stirring, the temperature is raised to 50° C. The reaction mixture is filtered. To the filtrate ice is added to lower the temperature to 5° C. and then 0.27 part of sodium chloride for each part by volume of the solution is added. The precipitated product is filtered, pressed in a hydraulic press and dried at 40-65° C. After grinding, it is light yellow in color and readily soluble in water.

The product obtained has probably the formula:

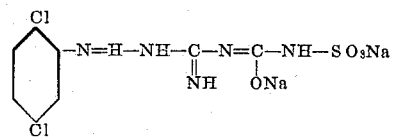

*Example 3*

3 parts of 2-nitro-4-methyl-aniline are stirred in a mixture of 9.8 parts of hydrochloric acid (23° Bé.) and 30 parts of water until thoroughly wet and dispersed. The temperature is lowered to 3-5° C. by addition of ice. The arylamine is diazotized by addition of 1.4 part of solid sodium nitrite while the temperature is kept below 7° C. by addition of ice. The solution is filtered before use.

To 150 parts by volume of water, heated to 80° C., are added 11 parts of guanyl-urea N-sulphonic acid, 6 parts of hydrated lime, and 5.3 parts of calcium acetate-hydrate. The mixture is stirred to a thick slurry and is then cooled to 5° C. by addition of ice. The diazo solution as prepared above is rapidly added. The temperature is maintained below 7° C. during the reaction, completion of which is indicated by a negative diazo test on spotting with alkaline R-salt.

To the reaction mixture is added a solution containing 16 parts of soda ash dissolved in 50 parts of warm water. The temperature of the reaction mixture which is stirred, is raised to 50° C. and the mixture is filtered. To the filtrate is added ice to lower the temperature to 5° C. and then 0.27 part of sodium chloride for each part by volume of the solution is added. The precipitated product is filtered, pressed in a hydraulic press and dried in vacuum at 40° C. After grinding the product shows a golden-brown color and is readily soluble in water.

*Example 4*

7.7 parts of 3-chloro-aniline are dissolved in 17.7 parts of hydrochloric acid (23° Bé.) and 170 parts of water. The solution is cooled to 3-5°

C. and diazotized by the addition of 4.2 parts of solid sodium nitrite, while it is stirred and the temperature is kept below 7° C. by addition of ice.

16.4 parts of guanyl-urea N-sulphonic acid are slurried in 390 parts of water and dissolved by the addition of 10.8 parts of sodium hydroxide. Ice is added to lower the temperature to 0–5° C., then the diazo solution prepared as above is slowly added. The mixture is stirred and the temperature is maintained below 10° C. during the reaction, the conclusion of which is indicated by a negative diazo test on spotting with alkaline R-salt.

The solution is heated to 22° C., filtered, and diluted with water to a volume of 1200 parts. 300 parts of sodium chloride are added slowly, and the slurry of precipitated product is cooled to 1° C. The product is filtered off, pressed in a hydraulic press, and dried at 40–65° C.; it shows a light yellow color and is readily soluble in water.

Example 5

3.2 parts of 2-methoxy-5-chloro-aniline are stirred with 5.9 parts of hydrochloric acid (23° Bé.) and 56 parts of water, the slurry is cooled to 0.5° C., and the amine is diazotized by adding 1.4 parts of solid sodium nitrite, while the temperature is kept below 5° C. by addition of ice.

60 parts of water are heated to 60° C. and 5.0 parts of hydrated lime and 11.1 parts of guanyl-urea-sulphonic acid are added with stirring, in the order given. The slurry is stirred and cooled to 0–5° C., and the diazo solution prepared above is added to it slowly at that temperature. Conclusion of the reaction is indicated by a negative diazo test on spotting with alkaline R-salt.

To the reaction mixture is added a solution of 7.8 parts of soda ash in 40 parts of water. The mixture is stirred while the temperature is raised to 50° C., and then filtered. The filtrate is diluted to 400 parts by volume with water. 100 parts of sodium chloride are added, the slurry is cooled to 0–5° C., and the precipitated product is filtered off, pressed in a hydraulic press, dried at 40–65° C., and ground. The product shows a yellow color and is readily soluble in water.

Example 6

1.84 parts of benzidine are dissolved in 5.9 parts of hydrochloric acid (23° Bé.) and 56 parts of water, and tetrazotized at 10° C. by adding 1.4 parts of solid sodium nitrite while the solution is stirred and the temperature kept at 10° C. by the addition of ice.

5.5 parts of guanyl-urea N-sulphonic acid are slurried in 130 parts of water and dissolved by adding 3.6 parts of sodium hydroxide. The solution is cooled to 0–5° C., then the tetrazo solution prepared as above is slowly added. The mixture is stirred and the temperature is maintained at 0–5° C. during the reaction, the conclusion of which is indicated by a negative diazo test with alkaline R-salt.

The volume is made up to 400 parts and the reaction mixture is heated to 30° C. and filtered by suction. To the filtrate 100 parts of sodium chloride are added. The slurry is cooled to 0° C., and the precipitated product is filtered off, pressed in a hydraulic press, dried in vacuo at 20° C., and ground. The product is light tan in color and dissolves completely in water.

Example 7

3.9 parts of 2-methyl-5-chloro-aniline hydrochloride (90.6%) are stirred with 2.94 parts of hydrochloric acid (23° Bé.) and 35 parts of water until well dispersed. Ice is added to lower the temperature to 3–5° C. The arylamine is diazotized by addition of 20 parts by volume of N/1 sodium nitrite while the mixture is stirred and the temperature is kept below 7° C. by addition of ice.

8.8 parts of N-nitro-guanyl-urea are suspended in 20 parts of water and dissolved by addition of 4.4 parts of sodium hydroxide. The temperature is adjusted at 20° C. and the diazo solution as prepared above is rapidly added. The mixture is stirred and the temperature is maintained at 18–20° C. during the reaction, conclusion of which is indicated by a negative diazo test on spotting with alkaline R-salt.

To the reaction mixture are added 0.22 parts of sodium chloride for each part by volume of the solution. The precipitated product is filtered, and dried at 60° C. The product is, after grinding, orange colored and is satisfactorily soluble in water.

It is understood, of course, that the invention is not limited to particular details set forth in the examples given. The parts are by weight corresponding to parts by volume of water.

In the claims the term "water-soluble" is used to define salts which show some solubility in water. It is used only in this sense and is not to be interpreted as meaning salts which are capable of forming aqueous solutions of high concentrations.

I claim:

1. Stabilized diazo compounds having the general formula R—G$_x$ in which R is a radical of an ice color diazo component, G is a radical of a guanyl-urea free from substituents capable of azoic coupling included in the group consisting of guanyl-urea-N-sulphonic acids, N-nitro guanyl-ureas and their water-soluble salts, and $x$ is 1 or 2.

2. Stabilized diazo compounds having the general formula R—G$_x$ in which R is a radical of an aromatic ice color diazo component, G is a radical of a guanyl-urea free from substituents capable of azoic coupling included in the group consisting of guanyl-urea-N-sulphonic acids, N-nitro guanyl-ureas and their water-soluble salts, and $x$ is 1 or 2.

3. Compounds according to claim 1 in which G is a radical of a compound included in the group consisting of guanyl-urea-N-sulphonic acid and N-nitro guanyl-urea and their water-soluble salts.

4. Stabilized diazo compounds having the following formula R—N=N—G in which R is an aromatic radical free from carboxylic and sulphonic groups, and G is a radical of a compound included in the group consisting of guanyl-urea N-sulphonic acid and its water-soluble salts.

5. Stabilized diazo compounds having the following formula

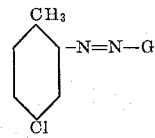

in which G is a radical of a compound included in the group consisting of guanyl-urea-N-sulphonic acid and its water-soluble salts.

6. Stabilized diazo compounds having the following formula

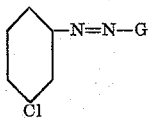

in which G is a radical of a compound included in the group consisting of guanyl-urea-N-sulphonic acid and its water-soluble salts.

7. Stabilized diazo compounds having the following formula

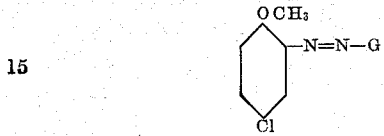

in which G is a radical of a compound included in the group consisting of guanyl-urea N-sulphonic acid and its water-soluble salts.

8. Monosodium salts of stabilized diazo compounds according to claim 1.

9. Disodium salts of stabilized diazo compounds according to claim 4.

10. A method of preparing stabilized diazo compounds which comprises condensing an ice color diazo component with a compound included in the group consisting of water-soluble salts of guanyl-urea N-sulphonic acids and N-nitro guanyl-ureas.

11. A method according to claim 10 in which condensation takes place in an alkaline medium with a pH of not less than 8.5.

12. A method of preparing stabilized diazo compounds which comprises condensing an ice-color diazo component with a compound included in the group consisting of calcium salts of guanyl-urea-N-sulphonic acids and N-nitro-guanyl-ureas.

13. A method of producing stabilized diazo compounds which comprises condensing an ice color diazo component with a compound included in the group consisting of water-soluble salts of guanyl-urea N-sulphonic acids and N-nitro guanyl-ureas, the condensation taking place in an alkaline medium, and salting out the salt of the stabilized compound formed.

ROBERT PRESCOTT PARKER.